(12) United States Patent
Miki et al.

(10) Patent No.: US 12,306,105 B2
(45) Date of Patent: May 20, 2025

(54) METHOD FOR INSPECTING PROBE MOLECULE

(71) Applicant: KABUSHIKI KAISHA TOSHIBA, Tokyo (JP)

(72) Inventors: Hiroko Miki, Kawasaki Kanagawa (JP); Yoshiaki Sugizaki, Fujisawa Kanagawa (JP); Hideyuki Tomizawa, Ota Gumma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 18/172,063

(22) Filed: Feb. 21, 2023

(65) Prior Publication Data

US 2024/0027350 A1    Jan. 25, 2024

(30) Foreign Application Priority Data

Jul. 21, 2022  (JP) .................. 2022-116413

(51) Int. Cl.
*G01N 21/65* (2006.01)
*G01J 3/44* (2006.01)

(52) U.S. Cl.
CPC ............... *G01N 21/65* (2013.01); *G01J 3/44* (2013.01)

(58) Field of Classification Search
CPC . E01D 19/06; E01D 22/00; G01J 3/44; G01N 21/65; G08B 21/182; G08B 5/00; F16G 13/02; F16G 13/06; F16G 13/07
See application file for complete search history.

(56) References Cited

FOREIGN PATENT DOCUMENTS

CN       113237868 A   *  8/2021  ........... G01N 21/658

OTHER PUBLICATIONS

Fernandes et al., "Functionalization of single-layer graphene for immunoassays", Applied Surface Science, 480 (2019) 709-716, 16 pages.
Purwidyantri et al., "Influence of the Electrolyte Salt Concentration on DNA Detection with Graphene Transistors", Biosensors 2021, 11, 24, 15 pages.
Hodkiewicz, "Characterizing Graphene with Raman Spectroscopy", Thermo Fisher Scientific, 3 pages (https://assets.thermofisher.com/TFS-Assets/MSD/Application-Notes/characterizing-graphene-raman-spectroscopy-en-an51946.pdf).

* cited by examiner

*Primary Examiner* — Tri T Ton
(74) *Attorney, Agent, or Firm* — Maier & Maier, PLLC

(57) ABSTRACT

A method for inspecting probe molecule includes evaluating the formation of the probe molecule at the surface of the graphene by comparing an intensity ratio a1/b1, and an intensity ratio a2/b2. The intensity a1 is of a peak of the first Raman spectrum having a peak top positioned in a first band of not less than 1200 $cm^{-1}$ and not more than 1500 $cm^{-1}$. The intensity b1 is of a peak of the first Raman spectrum having a peak top positioned in a second band of not less than 1510 $cm^{-1}$ and not more than 1800 $cm^{-1}$. The intensity a2 is of a peak of the second Raman spectrum having a peak top positioned in the first band. The intensity b2 is of a peak of the second Raman spectrum having a peak top positioned in the second band.

12 Claims, 4 Drawing Sheets

METHOD FOR INSPECTING PROBE MOLECULE

CROSS-REFERENCE TO RELATED APPLICATION

This application is based upon and claims the benefit of priority from Japanese Patent Application No. 2022-116413, filed on Jul. 21, 2022; the entire contents of which are incorporated herein by reference.

FIELD

Embodiments described herein relate generally to a method for inspecting probe molecule.

BACKGROUND

Graphene exhibits a large electrical characteristic change (high sensitivity) according to an atom or molecule binding, adsorbing, or approaching a surface of the graphene. There are expectations for applications of such graphene as ion sensors, enzyme sensors, DNA sensors, antigen/antibody sensors, protein sensors, breath sensors, gas sensors, etc., especially in the medical field. Although it has been proposed to use a probe molecule to functionalize the graphene surface of the graphene sensor, a method for inspecting the formation of the probe molecule at the surface of the graphene has not been established.

DETAILED DESCRIPTION

Figure 1:
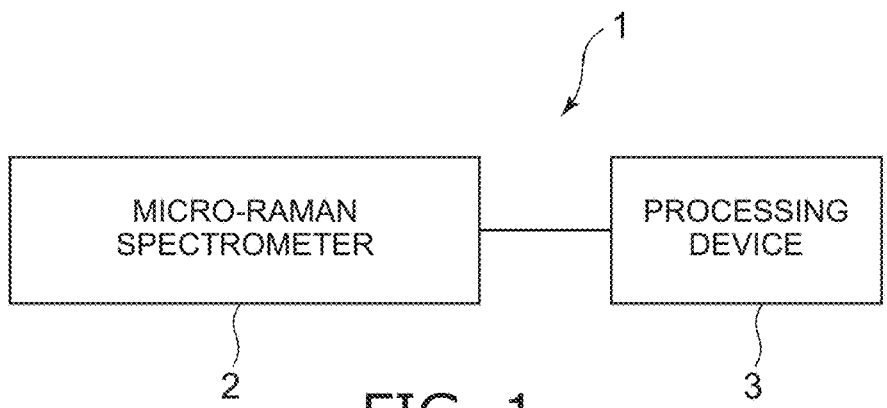
FIG. 1 is a schematic view showing a configuration of an inspection device of a probe molecule of an embodiment.

According to one embodiment, a method for inspecting probe molecule includes measuring a first Raman spectrum by irradiating an excitation light on a surface of graphene before forming a probe molecule; performing processing of forming a probe molecule at the surface of the graphene; measuring a second Raman spectrum by irradiating an excitation light on the surface of the graphene after the processing of forming the probe molecule; and evaluating the formation of the probe molecule at the surface of the graphene by comparing an intensity ratio a1/b1 of an intensity a1 and an intensity b1, and an intensity ratio a2/b2 of an intensity a2 and an intensity b2. The intensity a1 is of a peak of the first Raman spectrum having a peak top positioned in a first band of not less than 1200 $cm^{-1}$ and not more than 1500 $cm^{-1}$. The intensity b1 is of a peak of the first Raman spectrum having a peak top positioned in a second band of not less than 1510 $cm^{-1}$ and not more than 1800 $cm^{-1}$. The intensity a2 is of a peak of the second Raman spectrum having a peak top positioned in the first band. The intensity b2 is of a peak of the second Raman spectrum having a peak top positioned in the second band.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

The same or similar components are marked with the same reference numerals.

Figure 2:
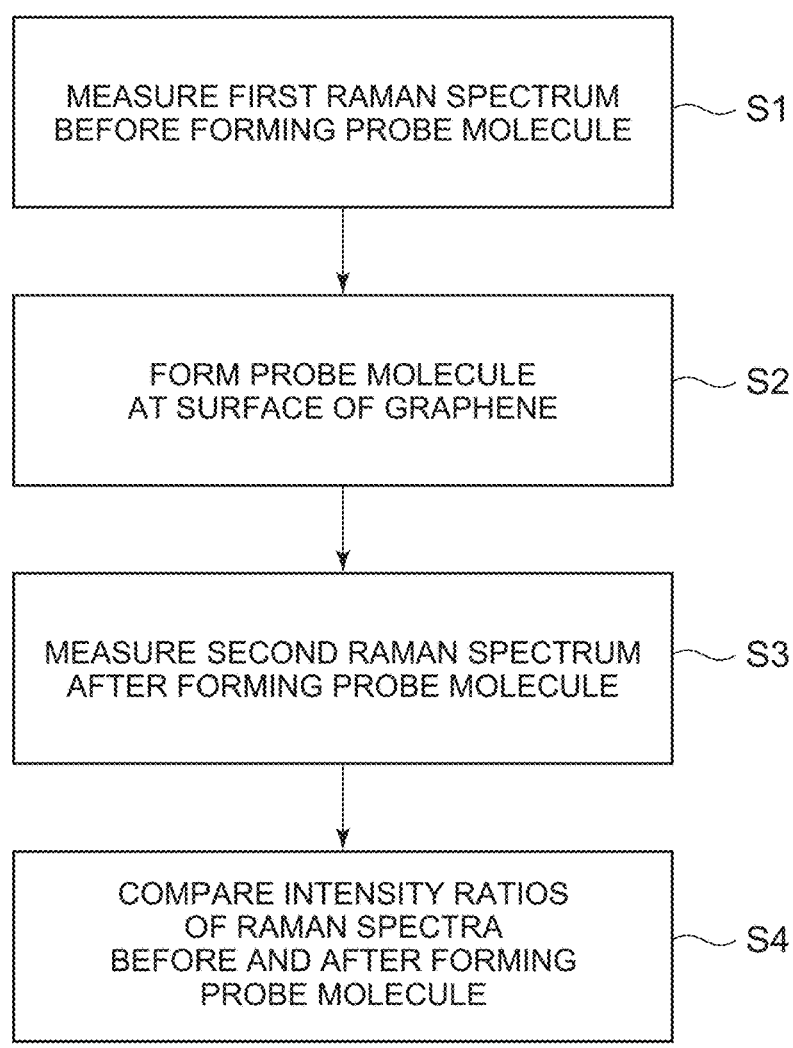
FIG. 2 is a flowchart of a method for inspecting the probe molecule of the embodiment.

As shown in FIG. 1, an inspection device 1 of a probe molecule of an embodiment includes a micro-Raman spectrometer 2 and a processing device 3. The method for inspecting the probe molecule of the embodiment includes steps S1 to S4 shown in FIG. 2. The steps will now be described.

Step S1

In step S1, the micro-Raman spectrometer 2 is used to measure a first Raman spectrum by irradiating an excitation light on a surface of graphene before forming a probe molecule.

Step S2

After the first Raman spectrum is measured, processing of forming a probe molecule at the surface of the graphene is performed in step S2. For example, the probe molecule is formed at the surface of the graphene by supplying, onto the surface of the graphene, an aqueous solution in which a probe molecule is dissolved, and by subsequently drying the aqueous solution.

The formation of the probe molecule at the surface of the graphene refers to the probe molecule being constrained at the surface of the graphene by the probe molecule being bound, adsorbed, or proximate to the graphene due to a chemical or charge-induced attraction, a hydrophobic interaction, etc. Any substance that can bind to a specific substance such as, for example, a protein, peptide, antibody, DNA aptamer, derivatives of these substances, etc., can be used as the probe molecule. For example, a DNA derivative that includes all or a portion of the (5' ACT GGA GCT CAA TCA GTA CAC GAC GGT TGC AAG TGG GAC TCT GGT AGG CTG GGT TAA TTT GGG ACA AGC TTC AAC CAT GGA GTA 3') sequence that can bind to (2-phenylethylamine) can be used as a DNA aptamer.

Step S3

After the processing of forming the probe molecule, the micro-Raman spectrometer 2 is used to measure a second Raman spectrum by irradiating an excitation light on the surface of the graphene in step S3. The measurement conditions (the setting conditions at the device side, the environmental conditions, etc.) are the same when measuring the first Raman spectrum and when measuring the second Raman spectrum; for example, the excitation light is laser light having a wavelength of not less than 600 nm. Although the upper limit of the wavelength of the excitation light is not particularly limited as long as the excitation light is laser light, the upper limit may be, for example, not more than 10600 nm.

Step S4

After the second Raman spectrum is measured, the processing device 3 is used to perform analysis processing of the first and second Raman spectra in step S4.

The processing device 3 calculates an intensity ratio a1/b1 of an intensity a1 of a peak of the first Raman spectrum having a peak top positioned in a first band (not less than 1200 cm$^{-1}$ and not more than 1500 cm$^{-1}$) and an intensity b1 of a peak having a peak top positioned in the first Raman spectrum in a second band (not less than 1510 cm$^{-1}$ and not more than 1800 cm$^{-1}$, and calculates an intensity ratio a2/b2 of an intensity a2 of the peak of the second Raman spectrum having a peak top positioned in the first band and an intensity b2 of the peak of the second Raman spectrum having a peak top positioned in the second band.

Or, the processing device 3 calculates the intensity ratio a1/b1 of the intensity a1 of a peak of the first Raman spectrum having a peak waveform positioned at 1300 cm$^{-1}$ and the intensity b1 of a peak of the first Raman spectrum having a peak waveform positioned at 1600 cm$^{-1}$, and calculates the intensity ratio a2/b2 of the intensity a2 of a peak of the second Raman spectrum having a peak waveform positioned at 1300 cm$^{-1}$ and the intensity b2 of a peak of the second Raman spectrum having a peak waveform positioned at 1600 cm$^{-1}$. A peak waveform is said to be positioned at 1300 cm$^{-1}$ when one of the two skirts of the peak waveform is at a position greater than 1300 cm$^{-1}$, and the other of the two skirts is at a position less than 1300 cm$^{-1}$.

The formation of the probe molecule at the surface of the graphene can be evaluated by comparing the intensity ratio a1/b1 and the intensity ratio a2/b2.

The processing device 3 calculates the peak intensity of the Raman spectrum as the area intensity or height intensity of a peak obtained by peak fitting using, for example, a Gaussian function. Also, peak fitting may be performed using a Gaussian function and a baseline obtained by extrapolating the skirts of the peak. A Lorenz function may be used instead of a Gaussian function in such processing. The peak intensity of the Raman spectrum may be calculated as the difference between the peak top and the baseline (corresponding to the height intensity).

Figure 3:
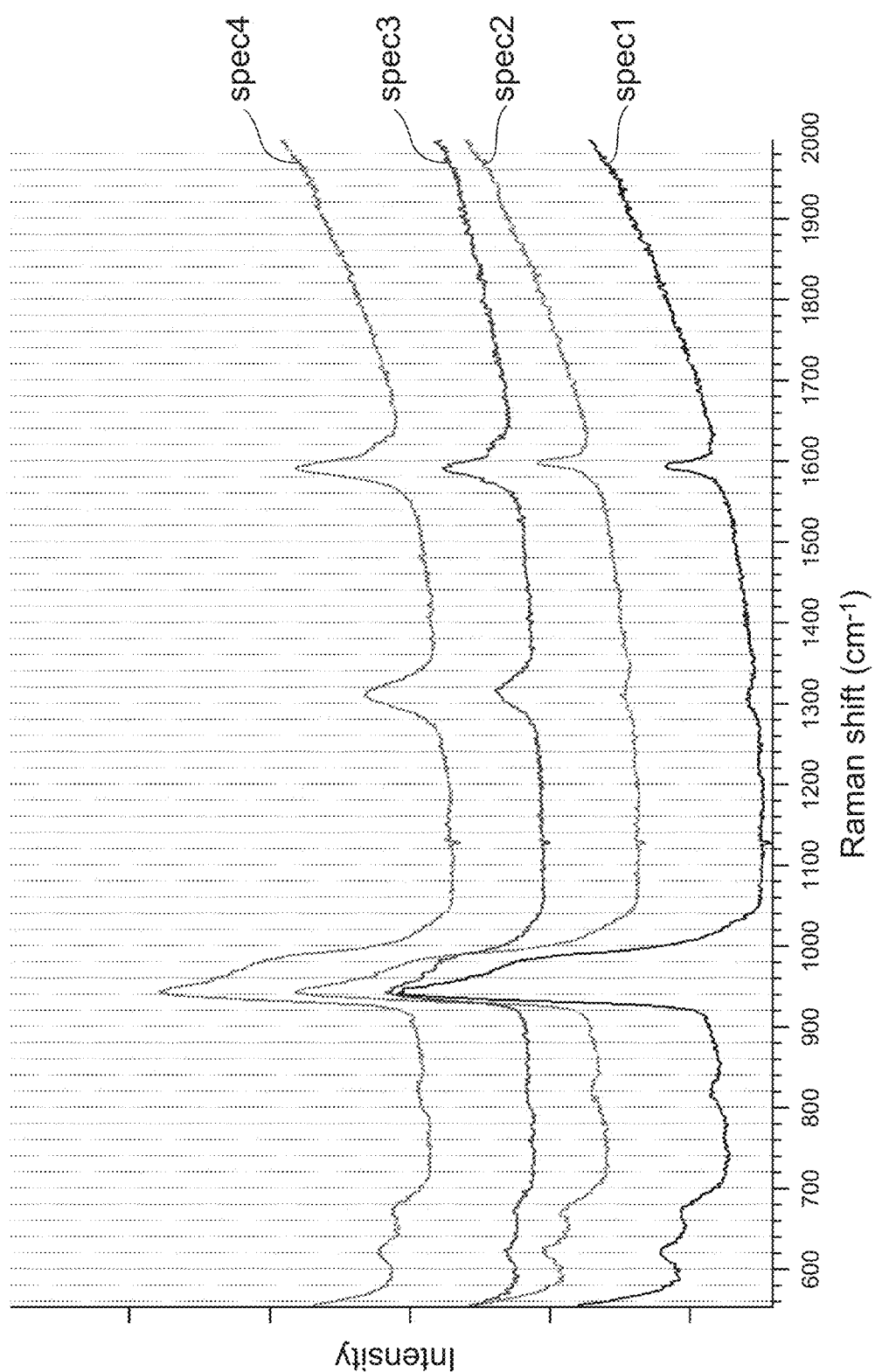
FIG. 3 is a graph showing an experimental example of Raman spectra.

FIG. 3 is a graph showing an experimental example of Raman spectra of a sample chip.

Figure 5A:
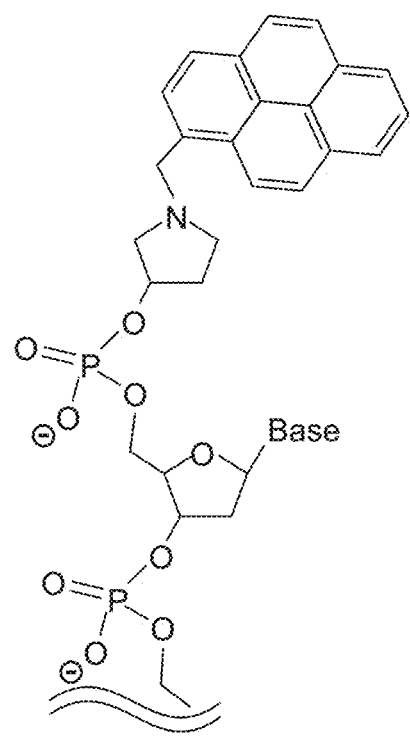
FIGS. 5A and 5B are structural formulas showing examples of pyrene-modified probe molecules.
Figure 5B:
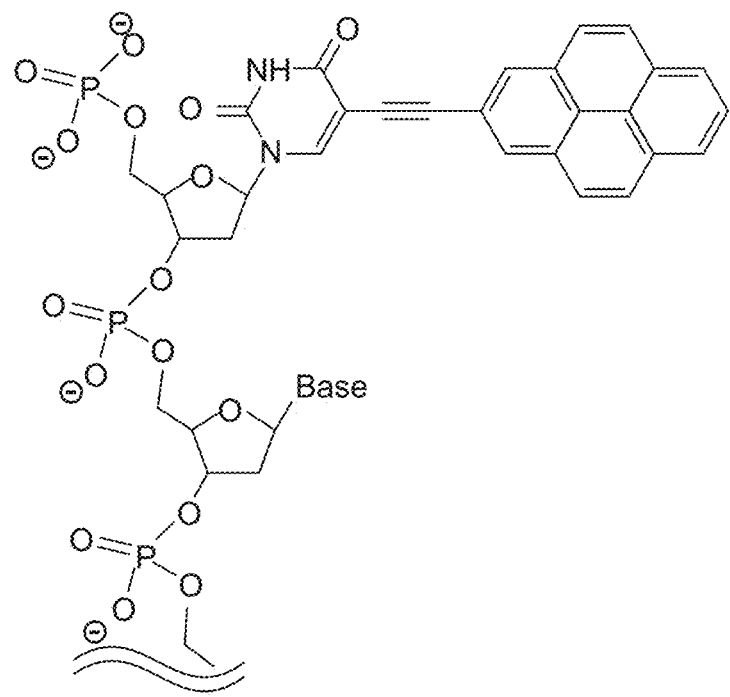

The formation processing of the probe molecule was performed for only a partial region of the surface of graphene formed on a sample chip; and Raman spectra were measured by irradiating laser light having a wavelength of 785 nm on four different locations of the surface of the graphene. The surface of the graphene was in a dry state and was not immersed in a liquid. Spec 1 and spec 2 illustrate Raman spectra at positions at which the formation processing of the probe molecule was not performed. Spec 3 and spec 4 illustrate Raman spectra at positions at which the formation processing of the probe molecule was performed. A DNA aptamer that had a pyrene-modified 5' terminal was used as the probe molecule. In the formation processing of the probe molecule, the DNA aptamer was bound to the graphene via the pyrene modifying the DNA. A DNA aptamer that has a pyrene-modified 3' terminal may be used as the probe molecule. FIGS. 5A and 5B show examples of how the DNA aptamers are pyrene-modified.

The intensity ratios a2/b2 of the intensities a2 of the peak having the peak top positioned in the first band (not less than 1200 cm$^{-1}$ and not more than 1500 cm$^{-1}$) for spec 3 and spec 4 and the intensities b2 of the peak having the peak top positioned in the second band (not less than 1510 cm$^{-1}$ and not more than 1800 cm$^{-1}$) for spec 3 and spec 4 are greater than the intensity ratios a1/b1 of the intensities a1 of the peak having the peak top positioned in the first band (not less than 1200 cm$^{-1}$ and not more than 1500 cm$^{-1}$) for spec 1 and spec 2 and the intensities b1 of the peak having the peak top positioned in the second band (not less than 1510 cm$^{-1}$ and not more than 1800 cm$^{-1}$) for spec 1 and spec 2.

Also, the intensity ratios a2/b2 of the intensities a2 of the peak having the peak waveform positioned at 1300 cm$^{-1}$ for spec 3 and spec 4 and the intensities b2 of the peak having the peak waveform positioned at 1600 cm$^{-1}$ for spec 3 and spec 4 are greater than the intensity ratios a1/b1 of the intensities a1 of the peak having the peak waveform positioned at 1300 cm$^{-1}$ for spec 1 and spec 2 and the intensities b1 having the peak waveform positioned at 1600 cm$^{-1}$ for spec 1 and spec 2.

In other words, the formation of the probe molecule at the surface of the graphene can be easily evaluated in a short period of time by comparing the intensity ratio a1/b1 and the intensity ratio a2/b2. For example, the formation of the probe molecule at the surface of the graphene can be determined to be good based on a simple magnitude relationship of the intensity ratio a1/b1 and the intensity ratio a2/b2, that is, when the intensity ratio a2/b2 is greater than the intensity ratio a1/b1.

Graphene was formed on a foundation of a SiO$_2$ film in the sample chip. It is considered that the peaks appearing in the band below 1050 cm$^{-1}$ in the Raman spectra spec 1, spec 2, spec 3, and spec 4 of FIG. 3 are peaks caused by SiO$_2$. The peaks in the band at the 1300 cm$^{-1}$ vicinity and the peaks in the band at the 1600 cm$^{-1}$ vicinity are caused by the graphene.

In the experimental example of FIG. 3, especially in the band at the 1300 cm$^{-1}$ vicinity, a large difference occurs between the peak intensities before and after forming the probe molecule. However, the peak intensity fluctuates due to the measurement conditions, measurement position, type of probe molecule, etc.; it is therefore difficult to discriminate whether or not the change of the peak intensity is due to the formation of the probe molecule by simply comparing the peak intensities in a specific band.

According to the embodiment, a reliable evaluation of whether or not the probe molecule is formed is possible by comparing the peak intensity ratio between two bands before and after forming the probe molecule.

The Raman spectrum can be measured for the surface of graphene in a liquid as well. However, for a reliable evaluation, it is favorable to measure the first and second Raman spectra described above by irradiating the excitation light on the surface of the graphene in a dry state.

Also, for a reliable evaluation, it is favorable to measure the first and second Raman spectra by irradiating the excitation light on the same position of the surface of the graphene. The measurement of the first and second Raman spectra is not limited to the same chip (or wafer) and may be performed for different chips (or wafers) of the same lot.

By setting the wavelength of the excitation light used to measure the Raman spectra to be not less than 600 nm, the effects of background noise due to light emission of organic substances can be reduced, and a micro peak intensity change caused by the formation of the probe molecule can be easily detected.

Figure 4:
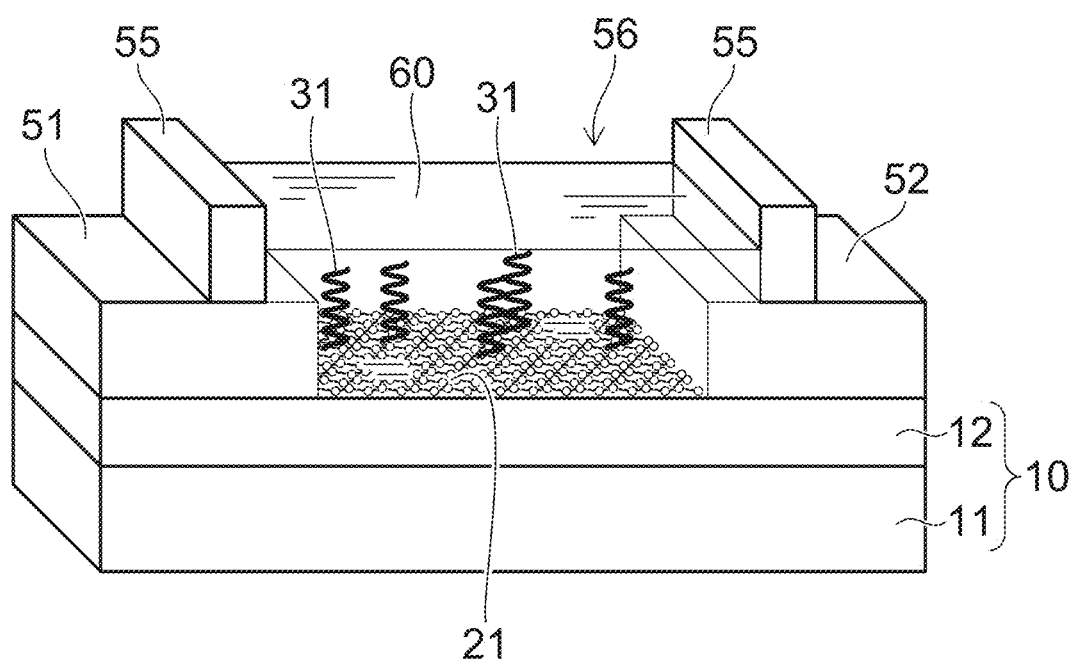
FIG. 4 is a schematic view showing an example of a graphene sensor functionalized by a probe molecule of an embodiment.

FIG. 4 is a schematic view showing an example of a graphene sensor functionalized by a probe molecule.

The graphene sensor includes a support 10, graphene 21 located on the support 10, and at least two electrodes (a first electrode 51 and a second electrode 52). For example, the sensor has a FET (field effect transistor) structure. Or, a Wheatstone bridge circuit may be formed from the sensors.

The support 10 includes a substrate 11, and a foundation film 12 located on the substrate 11. The graphene 21 is located on the foundation film 12. The graphene 21 may be located at the surface of the substrate 11 without providing the foundation film 12.

For example, silicon, silicon oxide, glass, or a polymer material can be used as the material of the substrate 11. The foundation film 12 is, for example, an insulating film such as a silicon oxide film or a fluorocarbon resin. Also, the foundation film 12 can have a chemical catalyst function for forming the graphene 21. A not-illustrated circuit and/or transistors may be formed in the substrate 11.

One of the first electrode 51 or the second electrode 52 functions as a drain electrode; and the other functions as a source electrode. The graphene 21 is located between the first electrode 51 and the second electrode 52. The first electrode 51 and the second electrode 52 electrically contact the graphene 21. A current flows between the first electrode 51 and the second electrode 52 via the graphene 21.

A probe molecule 31 is formed at the surface of the graphene 21. For example, at least one selected from the group consisting of an antibody, an aptamer, a peptide aptamer, and an enzyme can be used as the probe molecule 31.

In the example shown in FIG. 4, a well (or flow channel) 56 is surrounded with a sidewall 55, and is formed on the graphene 21; and the interior of the well 56 holds a liquid 60. The probe molecule 31 is inside the liquid 60.

The surface of the first electrode 51 and the surface of the second electrode 52 are covered with insulating films (not illustrated) so that the surface of the first electrode 51 and the surface of the second electrode 52 are not electrically connected directly with the liquid 60. For example, the surface of the graphene 21 may be covered with an insulating body such as a phospholipid film, etc., as necessary.

When the probe molecule 31 recognizes or captures the target substance, the electron state of the graphene 21 is changed by the charge of the target substance because the target substance approaches the surface of the graphene 21. The presence and/or concentration of the target substance can be known by electrically detecting the change of the electron state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A method for inspecting a probe molecule, the method comprising:
   measuring a first Raman spectrum by irradiating an excitation light on a surface of graphene before forming a probe molecule;
   performing processing of forming a probe molecule at the surface of the graphene;
   measuring a second Raman spectrum by irradiating an excitation light on the surface of the graphene after the processing of forming the probe molecule; and
   evaluating the formation of the probe molecule at the surface of the graphene by comparing
   an intensity ratio a1/b1 of an intensity a1 and an intensity b1, and
   an intensity ratio a2/b2 of an intensity a2 and an intensity b2,
   the intensity a1 being of a peak of the first Raman spectrum having a peak top positioned in a first band of not less than 1200 $cm^{-1}$ and not more than 1500 $cm^{-1}$,
   the intensity b1 being of a peak of the first Raman spectrum having a peak top positioned in a second band of not less than 1510 $cm^{-1}$ and not more than 1800 $cm^{-1}$,
   the intensity a2 being of a peak of the second Raman spectrum having a peak top positioned in the first band,
   the intensity b2 being of a peak of the second Raman spectrum having a peak top positioned in the second band.

2. The method according to claim 1, wherein the formation is determined to be good when the intensity ratio a2/b2 is greater than the intensity ratio a1/b1.

3. The method according to claim 1, wherein
   the excitation light is laser light having a wavelength of not less than 600 nm.

4. The method according to claim 1, wherein
   the first Raman spectrum and the second Raman spectrum are measured by irradiating the excitation light on the surface of the graphene in a dry state.

5. The method according to claim 1, wherein
   the first Raman spectrum and the second Raman spectrum are measured by irradiating the excitation light at a same position of the surface of the graphene.

6. The method according to claim 1, wherein
   the processing of forming the probe molecule at the surface of the graphene includes:
   supplying, onto the surface of the graphene, an aqueous solution in which the probe molecule is dissolved; and
   subsequently drying the aqueous solution.

7. A method for inspecting a probe molecule, the method comprising:
   measuring a first Raman spectrum by irradiating an excitation light on a surface of graphene before forming a probe molecule;
   performing processing of forming a probe molecule at the surface of the graphene;
   measuring a second Raman spectrum by irradiating an excitation light on the surface of the graphene after the processing of forming the probe molecule; and
   evaluating the formation of the probe molecule at the surface of the graphene by comparing
   an intensity ratio a1/b1 of an intensity a1 and an intensity b1, and
   an intensity ratio a2/b2 of an intensity a2 and an intensity b2,
   the intensity a1 being of a peak of the first Raman spectrum having a peak waveform positioned at 1300 $cm^{-1}$,
   the intensity b1 being of a peak of the first Raman spectrum having a peak waveform positioned at 1600 $cm^{-1}$,
   the intensity a2 being of a peak of the second Raman spectrum having a peak waveform positioned at 1300 $cm^{-1}$,
   the intensity b2 being of a peak of the second Raman spectrum having a peak waveform positioned at 1600 $cm^{-1}$.

8. The method according to claim 7, wherein the formation is determined to be good when the intensity ratio a2/b2 is greater than the intensity ratio a1/b1.

9. The method according to claim 7, wherein the excitation light is laser light having a wavelength of not less than 600 nm.

10. The method according to claim 7, wherein
the first Raman spectrum and the second Raman spectrum are measured by irradiating the excitation light on the surface of the graphene in a dry state.

11. The method according to claim 7, wherein
the first Raman spectrum and the second Raman spectrum are measured by irradiating the excitation light at a same position of the surface of the graphene.

12. The method according to claim 7, wherein
the processing of forming the probe molecule at the surface of the graphene includes:
   supplying, onto the surface of the graphene, an aqueous solution in which the probe molecule is dissolved; and
   subsequently drying the aqueous solution.

* * * * *